United States Patent [19]

Peters

[11] Patent Number: 5,399,598

[45] Date of Patent: Mar. 21, 1995

[54] ASPHALT COMPOSITION

[75] Inventor: William E. Peters, Danville, Ind.

[73] Assignee: Alphaflex Industries, Indianapolis, Ind.

[21] Appl. No.: 205,191

[22] Filed: Mar. 3, 1994

[51] Int. Cl.$^6$ ............... C08L 95/00; C08L 53/02; C08L 27/12; C08K 3/30

[52] U.S. Cl. .................... 524/68; 524/59; 524/406; 524/420; 524/505; 524/546; 264/211.23

[58] Field of Search ............ 524/59, 68, 406, 420, 524/505, 546; 264/211.23

[56] References Cited

U.S. PATENT DOCUMENTS

| | | | |
|---|---|---|---|
| 2,710,290 | 6/1955 | Safford et al. | 260/41 |
| 2,719,833 | 10/1955 | Vincent et al. | 260/33.6 |
| 2,951,721 | 9/1960 | Asp | 288/16 |
| 3,019,206 | 1/1962 | Robb | 260/29.6 |
| 3,230,919 | 1/1966 | Crawford | 114/67 |
| 3,575,123 | 4/1971 | Shepherd et al. | 114/67 R |
| 3,878,031 | 4/1975 | Dormer | 428/365 |
| 3,940,455 | 2/1976 | Kaufman | 260/888 |
| 4,075,158 | 2/1978 | Coale | 260/42.17 |
| 4,096,207 | 6/1978 | Saxon et al. | 260/900 |
| 4,129,550 | 12/1978 | Nametkin et al. | 260/42.22 |
| 4,183,887 | 1/1980 | Karg | 264/130 |
| 4,215,178 | 7/1980 | Martin, Jr. | 428/421 |
| 4,326,046 | 4/1982 | Miyaka et al. | 525/276 |
| 4,385,019 | 5/1983 | Bernstein et al. | 264/49 |
| 4,387,168 | 6/1983 | Morita | 521/54 |
| 4,507,439 | 3/1985 | Stewart | 525/199 |
| 4,520,170 | 5/1985 | Kitto | 525/200 |
| 4,596,839 | 6/1986 | Peters | 524/406 |
| 4,762,869 | 8/1988 | Heinz et al. | 524/59 |
| 4,962,136 | 10/1990 | Peters | 524/406 |

FOREIGN PATENT DOCUMENTS 996764 6/1965 United Kingdom.

OTHER PUBLICATIONS

*RSI*, Special Supplement, Sep. 1992.
Shell Chemical Company Technical Bulletin SC:1426-92, *Hot Mix Plant Processing of Asphalts Modified with KRATON SBS Polymer*.
Shell Chemical Company publication SC:937-89, *KRATON Rubber*.
Amax, Inc. article, *How Does MoS$_2$ Differ From Other Solid Lubricants?*
Imperial Chemical Industries, Ltd. publication, '*FLUON*': *Polytetrafluoroethylene*.
ICI Americas, Inc. product information brochure, *Fluon CD 1*.
ICI Americas, Inc. product information brochure, *Fluon CD 525*.
Dow Corning Corp. product description, *Information about MOLYKOTE Specialty Lubricants*, 1979.
Amax, Inc. product data sheet SC-9, *Molybdenum Products*, 1985.

*Primary Examiner*—Peter Szekely
*Attorney, Agent, or Firm*—Willian Brinks Hofer Gilson & Lione

[57] ABSTRACT

An asphalt composition comprises asphalt mixed with an asphalt modifier, which combines a thermoplastic elastomeric copolymer and an effective amount of a fibrillated polytetrafluoroethylene and molybdenum disulfide particles. The thermoplastic elastomeric copolymer preferably comprises two incompatible polymers forming a two-phase copolymer including a thermoplastic end block polymer and an elastomeric mid block polymer. Preferably, the thermoplastic end block polymer is a styrene polymer and the elastomeric mid block polymer is selected from a group consisting of polybutadiene, polyisoprene and poly(ethylene-butylene). The asphalt modifier is made by mixing together under high shear, as for example, in a twin screw extruder, particles of a thermoplastic elastomeric copolymer, fibrillatable polytetrafluoroethylene and molybdenum disulfide until the fibrillatable polytetrafluoroethylene is substantially fibrillated and combined with the thermoplastic elastomeric copolymer. A preferred asphalt modifier comprises about 2 to about 12 parts of fibrillated polytetrafluoroethylene and molybdenum disulfide particles per 100 parts by weight of copolymer, with the ratio of fibrillated polytetrafluoroethylene to molybdenum disulfide being about 3 to 1 by weight.

27 Claims, No Drawings

ASPHALT COMPOSITION

FIELD OF THE INVENTION

This invention relates to asphalt compositions and particularly to compositions which include bitumen modifiers. More particularly, the invention relates to asphalt compositions having asphalt modifiers that include thermoplastic, non-vulcanite elastomeric copolymers.

BACKGROUND OF THE INVENTION

Asphalt is a bitumen which is available in many varieties depending upon its natural origins and on the industrial process used in its production. Chemically, bitumens, such as asphalt, are a mixture of aliphatic, aromatic and naphthenic hydrocarbons with high molecular weight and small quantities of organic acids, bases and heterocyclic components containing nitrogen and sulfur. Asphalt is a colloidal substance, in which, the dispersed phase consisting of asphaltene, is covered by a protective phase of polar resins in complexes called micelles which are dispersed in a phase consisting of oils. The chemical natures of the various phases are not readily definable. Generally, however, the nucleus has characteristics that are more aromatic than naphthenic, the protective resins are prevalently naphthenic and the oils, which cover the micelles have a paraffinic character. The properties of bitumens, such as asphalt, are strictly associated with the balance of the percentages of its components. Due to the difficulty of performing an exact chemical analysis, a classification is normally accepted which is based upon fractionated precipitation of the bitumen using selective solvents and an elution of the soluble in a chromatographic column (ASTM S2007-75 Method). Identification of an asphalt or bitumen is made by combining the results of this analysis with the values of penetration, softening and penetration index. Physically bitumen is a visco-elastic material, with viscous flow under slow stress and at high temperatures and more elastic behavior under rapid stress at low temperature.

Due to its wide availability, relatively low price and ease of application, asphalt has found a widespread use as a road-building material, notwithstanding its visco-elastic behavior. Intrinsic limitations accompany the use of asphalt as a road-building material. Asphalt demonstrates softening and unwanted flow at high temperatures, brittleness and unwanted fracturing at low temperatures, poor mechanical and elastic characteristics and a tendency to aging with exposure. Mineral aggregate is frequently added to asphalt to modify its rheology and temperature susceptibility. Roads frequently are laid with a base course and binder layers that insulate the upper asphalt surface from the ground, and the upper asphalt road surface develops extremely hot temperatures during the summer months and extremely cold temperatures during the winter months. The rheology of asphalt is such that, notwithstanding mineral additives, at high temperatures, it will flow in response to stresses imposed by vehicular traffic and develop "ruts" that not only provide unacceptable surface for vehicular travel, but provide localized areas of unacceptable thickness which crack under loads imposed by vehicular traffic at cold temperatures of winter and form pits (referred to as "chuckholes").

The efforts made to solve these shortcomings include the addition of modifying polymers to the asphalt used in the construction of roads. The selection of asphalt modifying polymers, however, must satisfy a number of requirements. The modifying polymer must not cause unwanted increases in the viscosity of the asphalt in its molten state or interfere with the use of existing road-building processes and apparatus. The modifying polymer should be sufficiently compatible with the asphalt as to not cause phase separation. In addition, the modifying polymer must be cost effective, that is, the polymer should improve the rheology and strength of the asphalt with which it is mixed sufficiently that any increased road costs imposed by use of the modifying polymer are recovered through reduced road maintenance and resurfacing costs.

A number of polymers have been considered for use in modifying bitumens and asphalts for use in roads.

Atactic polypropylene (APP) contributes a continuous matrix when it is mixed with bitumen at levels of 20 to 30 parts per hundred parts of bitumen. At such levels APP contributes no significant influence on the viscosity of the resulting mixture in its molten state. The viscosity remains acceptably low and dispersion of the APP in the bitumen is readily achieved. However, the resulting mixture is susceptible to phase separation, particularly during hot storage and requires special precautions and use. While bitumen modified with APP demonstrates increased stiffness, high ring and ball and low penetration values, the cohesion forces and mechanical characteristics of the APP-modified material remain poor and no appreciable improvements in the mechanical properties are achieved. Through the intrinsic stiffness of the resulting APP-modified bitumen, stresses of a given magnitude must be exceeded to obtain deformation, but because of its plastic behavior the deformation is generally irreversible. When subjected to temperature cycling, APP-modified bitumen behaves in an unsatisfactory manner and cracks even with small flexures. Although APP is a saturated polymer, it also demonstrates de-polymerization phenomena with a consequent loss of continuous lattice and separation of phases.

Thus, as an asphalt modifier, APP can contribute benefits in the manufacturing of modified asphalt in its easy solubility and low viscosity and in the application of the modified asphalt through the ease with which it is rolled and applied; however, the modification of asphalt with APP is not generally satisfactory because of the lack of an appreciable improvement in the elasticity and the mechanical properties of the resulting modified asphalt.

Asphalts have been more successfully modified for road applications through the use of thermoplastic, non-vulcanite elastomeric block copolymers. Thermoplastic elastomeric block copolymers differ in molecular structure from typical plastic and commercial rubbers, which are generally homopolymers or random copolymers, in that they generally comprise a thermoplastic end block polymer, that is, chemically bound to and interconnected by an elastomeric mid block polymer. It has been known for many years that bitumens such as asphalt, may be modified with thermoplastic elastomeric block copolymers to increase their softening temperature, reduce their cold flow, improve their low temperature flexibility, improve their elastic recovery and improve their resistance to deformation. Such block copolymers can be blended with asphalt and using conventional road-building machinery, are capable of satisfactory hot storage in the modified state, and provide a sufficient improvement in the rheology and physical characteristics of the modified asphalt in a sufficiently low quantity and at a sufficiently low cost as to provide a cost effective improvement in the resulting asphalt road.

As noted above, thermoplastic elastomeric block copolymers generally comprise two incompatible polymers, a thermoplastic end block polymer, typically polystyrene, chemically joined with one of several elastomeric mid block polymers. Asphalt modifying block copolymers are sold commercially by the Shell Chemical Company of Houston, Tex., under its registered trademark, KRATON, and by EniChem Elastomeri Srl, of Milano, Italy, under its registered trademark Europrene.

Such block copolymers combine high tensile strength and flow resistance as a result of the polystyrene end blocks and high elasticity, cold temperature flexibility and fatigue resistance as a result of their elastomeric mid blocks. In use, the block copolymers tend to provide an elastic lattice interconnected by domains formed by their thermoplastic end blocks. Since the lattice structure is the result of physical rather than chemical forces, it may be destroyed either by dissolving the copolymer in a solvent or by heating it beyond the glass transition temperature of its thermoplastic end blocks. Upon evaporation of the solvent or cooling below the glass transition temperature of its thermoplastic end blocks, a structure may be re-imparted to the block copolymer. Such block copolymers are thus recyclable.

Thermoplastic block copolymers which can be successfully used with bitumens include styrene-butadiene-styrene copolymers (SIS) and styrene-ethylene/butylene-styrene copolymers (SEBS). In addition to the traditional ABA-type tri-block polymers, such copolymers are available in the radial $(A-B)_N$ and a di-block (A-B) structures. Prior to processing, the polystyrene end blocks of such copolymers are associated in rigid domains through physical cross-linking to yield a continuous three dimensional network. During processing in the presence of heat and shear or solvent, the polystyrene domains soften and permit flow and after cooling, reform to lock the interconnecting elastomeric network in place. As noted above, styrene domains impart high tensile strength to the resulting structure and the elastomeric mid block polymers impart elasticity, cold flow flexibility and fatigue resistance. Of these block copolymers, the SBS elastomers have been most frequently used to modify and improve asphalts for road construction.

When such SBS copolymers added to asphalt, a phase version takes place, and the asphalt is absorbed by a comparatively minor portion of SBS, which swells substantially. In preparation of modified asphalt, the molten asphalt softens the styrene end blocks of the SBS copolymer to allow a homogeneous polymer blend to be formed. High temperatures such as from 284° F. (140° C.) to 356° F. (181° C.), which are well above the styrene glass transition temperature of about 212° F., permit fast polymer dissolution; however, mixing temperatures are kept below 390° F. (199° C.) to avoid unacceptable polymer degradation, and storage temperatures are generally maintained below 320° F. (160° C.).

High shear mixers such as the Siefer Trigonal and System Villas mixers are preferably used in blending the SBS copolymer and asphalt, in conjunction with internally agitated tanks. Such systems can produce several thousand gallons of modified asphalt per hour.

The modification of asphalt with SBS copolymer provides a significant improvement in the rheology of the modified asphalt by providing reduced temperature susceptibility and increased flexibility at low temperatures and better resistance to flow and deformation at high temperature. Modification of the asphalt binders with SBS copolymer further improves tensile strength and the stiffness modulus at high temperatures, adhesion between the asphalt and the aggregate, and greater resistance to surface abrasion. At 75° C. (167° F.), unmodified AC5 asphalt has a viscosity of about 100 poise. The addition of about three percent (3%) SBS modifier (by weight) increases the viscosity of the modified asphalt about ten-fold, the addition of six percent (6%) SBS modifier (by weight) increases the viscosity of the modified asphalt well over 100-fold, and the addition of 15 percent (15%) SBS modifier (by weight) increases the viscosity of the modified asphalt well over 1000-fold.

Whenever composition ingredients are expressed in percentages, it is to be understood that the expressed percentage is the percent by weight of the resulting composition, unless otherwise stated. Where compositions are expressed in parts, it is to be understood that they are expressed in parts per hundred parts rubber by weight.

Up to temperatures of 70° C. (158° F.), the physical and rheological properties of modified asphalt are highly dependent on the level of the SBS modifier used. Tests of the penetration index of asphalt modified with an SBS modifier indicate little improvement in penetration index below three percent of SBS modifier, but a rapid improvement in penetration index between three and eight percent levels. Modified asphalts with over about eight percent of SBS modifier, however, demonstrate only modest improvements in penetration index, indicating that the addition of SBS modifier to asphalt in levels of six to eight percent are efficient for improvement of the temperature susceptibility of the modified asphalts. Tests of the stiffness modulus of modified asphalts indicate that improvements in the stiffness modulus are not significant until the percentage of SBS modifier nears six percent and that the stiffness modulus continues to improve as higher and higher levels of SBS modifier are used. As little as three percent SBS modifier in asphalt can improve the tensile strength, low temperature flexibility and rutting resistance of asphalts; however, it is generally considered that the additional improvements in temperature susceptibility associated with six percent or greater SBS asphalt loading are required.

In hot climates, aggregate, such as crushed limestone particles having diameters in the range of one-half to three-quarters of an inch in diameter, commonly called "chips", are added to the upper surface of an asphalt road to reduce its surface temperature and temperature susceptibility by isolating the asphalt surface from the effects of solar radiation, and to improve traction. Retention of such road chips on the road surface is substantially improved with modification of the surface asphalt by SBS modifiers. The modified asphalt demonstrates improved adhesion with the chip particles and provides a stronger, more ductile and elastic interface between the chips and the road surface. When SBS modified asphalt is used, road tests demonstrate that road surfaces formed with SBS modified asphalt and chips have a substantially longer life compared with unmodified asphalts where such surfaces fail to retain the chips.

More recently, it has become desirable to use ground rubber instead of aggregate as an extender for asphalt in road construction. Used tires provide a plentiful source of rubber and the use of old tires for ground rubber in road surfaces solves an environmental disposal problem. The use of ground rubber as an extender for asphalts, however, reduces the physical strength of the asphalt because, it is believed, of the reduced adhesion between the asphalt, reground rubber and any aggregate used in the road surface. Thus, the use of reground rubber in asphalt accentuates the susceptibility of the asphalt to rutting through its decreased flow resistance.

While SBS block copolymers are generally preferred for the modification of asphalts, styrene-isoprene block copolymers and linear styrene-ethylene/butylene styrene block copolymers all find use as asphalt modifiers.

U.S. Pat. Nos. 4,596,839 and 4,962,136 disclose the improvement of the elastomer compositions by an additive including particulate polytetrafluoroethylene and an amount of particulate molybdenum disulfide effective to provide uniform mixing of the polytetrafluoroethylene and the elastomer composition. These patents further disclose a new composition can comprise about 25 to about 80 percent polytetrafluoroethylene and about 1 to about 30 percent molybdenum disulfide by weight, with the balance of elastomer. The patents also disclose preferable compositions including about 2 to about 6 percent of polytetrafluoroethylene that is fibrillatable and fibrillated in the composition when combined with an effective amount of molybdenum disulfide. The polytetrafluoroethylene-molybdenum disulfide additives are disclosed as being useful in polymers, generally known as rubbers, including natural rubber and synthetic rubber elastomers and other polymers capable of forming elastic solids with similar properties. More specifically, such elastomers include, in addition to natural rubber, styrene butadiene rubber, acrylonitrile butadiene rubber, butyl rubber, ethylene-propylene rubber, polyurethane elastomers, CIS-polybutadiene polychloriprene, poly(epichlorohydrin), polyacrylate, silicone rubbers, poly(fluorinated hydrocarbons), olefin polysulfide, polyisoprene and the like. It is also disclosed that such compositions can also include plasticizers and softeners, extenders, reclaimed rubber, fillers, reinforcing fillers, coloring agents, antioxidants, accelerators and vulcanizing actuators.

BRIEF STATEMENT OF THE INVENTION

This invention provides an asphalt composition comprising asphalt and an asphalt modifier. The asphalt modifier comprises a thermoplastic elastomeric copolymer and an effective amount of a fibrillated polytetrafluoroethylene and molybdenum disulfide particles. The thermoplastic elastomeric copolymer preferably comprises two incompatible polymers forming a two-phase copolymer including a thermoplastic end block polymer and an elastomeric mid block polymer. In preferable asphalt modifiers of the invention, the thermoplastic end block polymer is a styrene polymer and the elastomeric mid block polymer is selected from a group consisting of polybutadiene, polyisoprene and poly(ethylene-butylene). A preferred asphalt modifier comprises about 2 to about 12 parts of fibrillated polytetrafluoroethylene and molybdenum disulfide particles per 100 parts by weight of copolymer, with the ratio of fibrillated polytetrafluoroethylene to molybdenum disulfide being about 3 to 1 by weight.

In the invention an asphalt composition is made by mixing a quantity of asphalt with an effective asphalt modifier. The asphalt modifier is made by mixing together under high shear, as for example, in a twin screw extruder, particles of a thermoplastic elastomeric copolymer, fibrillatable polytetrafluoroethylene and molybdenum disulfide until the fibrillatable polytetrafluoroethylene is substantially fibrillated and combined with the thermoplastic elastomeric copolymer.

DETAILED DESCRIPTION OF A PREFERRED EMBODIMENT

The present invention provides improved bitumen or asphalt compositions for use in diverse applications, such as, for example, in road-building, roofing, sealants and adhesives. In the invention, a thermoplastic, non-vulcanite elastomeric copolymer is combined with fibrillatable polytetrafluoroethylene particles and molybdenum disulfide particles to form a modifier, and the modifier is mixed with bitumen to provide an improved bitumen composition.

The thermoplastic elastomeric copolymer portion of asphalt modifiers used in of the invention can comprise thermoplastic elastomers, most preferably, thermoplastic elastomeric block polymer elastomers. The elastomeric copolymers of the invention generally comprise at least two incompatible polymers that react to form a two-phase copolymer including thermoplastic polymer end blocks and an elastomeric polymer mid block. In use, the thermoplastic polymer end blocks form, as one phase, discrete thermoplastic "domains" that are separate from interconnecting elastomeric "chains", as the second phase, formed by the elastomeric mid block polymers.

Thermoplastic elastomeric copolymers that may be used in the invention include the thermoplastic rubbers sold by the Shell Chemical Company of Houston, Tex., as their KRATON D-grades 1100 Series, 1300 Series and 4000 Series and KRATON G-grades 1600 and 1700 Series, and the thermoplastic rubbers sold by EniChem Elastomeri Srl of Milano, Italy, and EniChem Elastomers Ltd. of South Hampton, Great Britain as their EUROPRENE SOL T Nos. 161A, 161B, and E6302. These thermoplastic non-vulcanite elastomers include linear styrene-butadiene-styrene copolymers, branch styrene-butadiene copolymers, linear styrene-isoprene-styrene copolymers, branch styrene isoprene copolymers, linear styrene-ethylene/butylene-styrene copolymers, and di-block styrene ethylene-propylene copolymers. The preferred thermoplastic elastomeric copolymers for use in asphalt modifiers of the invention are those comprised of linear styrene-butadiene copolymers, such as, Shell Chemical's KRATON D1102 and EniChem Elastimeri's Europrene SOL TE6302, in pellets, powder-like and crumb form.

In the asphalt modifier used in the invention such thermoplastic elastomeric copolymers are combined with fibrillatable polytetrafluoroethylene (PTFE) particles and molybdenum disulfide particles, which are preferably preassociated.

The fibrillatable PTFE preferred for use in the invention is a coagulated dispersion polymer such as FLUON CD1 made by ICI Americas, DF11X made by Ausimont, or TEFLON K-10 made by E. I. dupont de Nemours. In the past, such coagulated dispersions have been exposed at high temperatures in drying the particulate resin material. The fibrillatable PTFE preferably used in my invention should be exposed to lower temperatures in drying the particulate resin material to obtain fibrillatable PTFE particles capable of fibrillation to achieve very high length-to-diameter ratios. In addition, such fibrillatable PTFE is accompanied by polytetrafluoroethylene binder. In determining preferred coagulated dispersions, preferred coagulated dispersions can be extruded through a small orifice (e.g., orifice with a cross section of about ¼ inch or less) by a hydraulic ram with pressures of only about 12,000 psi, while non-preferred resins require markedly higher ram pressures of, for example, 15,000 psi.

FLUON CD1 is a preferred fibrillatable PTFE in the invention because it can be dispersed more readily in the elastomer and fibrillates with a greater length-to-diameter ratio than other fibrillatable polytetrafluoroethylenes.

As indicated above, it is believed that the manner in which the coagulated dispersion polymers that comprise fibrillatable polytetrafluoroethylene are processed during their manufacture affects the structure of the fibrillatable PTFE particles and the ease with which they may be fibrillated into fibers having a high ratio of fiber length to fiber diameter. Although it is not clearly understood, it is further believed that altering manufacturing processes to reduce dense or hard layers on the outside of the PTFE polymer particles permits the particles to be drawn into longer and thinner fibers. Among the factors used in manufacturing coagulated dispersions that may increase the surface hardness of the coagulated dispersion PTFE particles are the processing steps used to avoid further agglomeration of the coagulated dispersion PTFE particles and to remove anti-agglomeration agents and water from, and dry, the coagulated dispersion particles. Use of high temperatures, for example, to remove lubricants and water and dry the coagulated dispersion particles may tend to make the surface of coagulated dispersion particles harder or more dense and render them more difficult to fibrillate.

The preferred molybdenum disulfide is technical grade powder such as that sold by Amax, Inc. as its technical fine grade. Such powdered molybdenum disulfide generally has, in technical grade, about 85 percent of its particles smaller than 44 microns, may be provided with small average of particle sizes (e.g., less than ten microns), and is characterized by substantial purity with over 98 percent comprising molybdenum disulfide and less than two percent comprising such materials as insoluble acids, minerals, carbon, water and oil. Molybdenum disulfide withstands pressures exceeding 500,000 psi and is serviceable through temperatures of −375° F. to 750° F.

The molybdenum disulfide particles are an important part of the asphalt modifier of this invention. Fibrillatable PTFE alone tends to sheet rather than fibrillate when an attempt is made to mix it with thermoplastic copolymer elastomers. In addition, it is believed that the molybdenum disulfide permits more intimate engagement of the fibrillated PTFE and thermoplastic elastomeric copolymer structure through its reaction with the surfaces of the PTFE and thermoplastic elastomeric copolymer.

In manufacturing asphalt modifiers of this invention, the particles of fibrillatable PTFE and molybdenum disulfide are preferably preassociated. In preparing the preassociated combination of PTFE and molybdenum disulfide, particulate fibrillatable PTFE and particulate molybdenum disulfide are preferably placed together in a mixing apparatus, such as a rotating mixing barrel, and intermixed together. Preferably, the particle size of the molybdenum disulfide particles is generally many times smaller than the particle size of the fibrillatable polytetrafluoroethylene. Fibrillatable polytetrafluoroethylene can have median particle sizes as large as 450 to 600 microns, although average particle sizes substantially smaller than 450 to 600 can be used. The molybdenum disulfides used in the invention preferably are technical grade and have a substantial majority of particles with sizes less than about 45 microns, with average particle sizes as small as about four microns and less. The average particle size of the molybdenum disulfide can be one-twentieth that of the fibrillatable polytetrafluoroethylene and smaller. The particulate matter is mixed together for a sufficient time that the molybdenum disulfide particles are generally adherent to the fibrillated polytetrafluoroethylene particles, and the mixture particles become uniformly grey-black in appearance. As an example, 150 pounds of additive material was obtained with 15 minutes of agitation and mixing. The adherence of the molybdenum disulfide particles to the particulate polytetrafluoroethylene is believed to be enhanced by an electrostatic charge differential that may be developed between the polytetrafluoroethylene particles and the molybdenum disulfide particles while they are being mixed together.

The prior association of molybdenum disulfide particles with fibrillatable polytetrafluoroethylene particles greatly assists the fibrillation and uniform combination of the fibrillated polytetrafluoroethylene with the thermoplastic elastomer copolymer in preparation of bitumen and asphalt modifiers used in asphalts compositions of this invention. The molybdenum disulfide particles associated with the surface of the fibrillatable polytetrafluoroethylene particles, it is believed, enhance the combination of the fibrillated polytetrafluoroethylene particles with the elastomeric polymer phase of the thermoplastic copolymer and deter an adherent association of the polytetrafluoroethylene particles with themselves. Furthermore, it is believed that the coating of molybdenum disulfide particles on the fibrillatable polytetrafluoroethylene particles interacts with the surrounding thermoplastic elastomeric copolymer upon mixing and assists in the fibrillation of the polytetrafluoroethylene.

One additive comprises fibrillatable PTFE, preferably FLUON CD1 OF ICI Americas, Inc., which is soft as a result of lower temperature drying of the PTFE particles during manufacture and capable of extrusion through a small orifice by a hydraulic ram at pressures of 12,000 psi or less, and a technical grade molybdenum disulfide powder, such as that sold by Amax, Inc., and Cyprus Industrial Minerals Company, generally adherent to the fibrillatable PTFE particles. The ratio of fibrillatable PTFE to molybdenum disulfide in the additive is from about 3 to 1 to about 6 to 1 by weight. The preassociated PTFE and molybdenum disulfide combine more easily with some thermoplastic elastomeric copolymers than with others, and it may be possible and advisable to produce the preassociated PTFE and $MoS_2$ additives with ratios other than as set forth above.

In the manufacture of the asphalt modifier of the invention, the thermoplastic elastomeric copolymer, preferably in crumb-like or powder-like form and, preferably, the preassociated fibrillatable polytetrafluoroethylene and the molybdenum disulfide particles are combined in a high shear mixer such as, preferably, a twin screw extruder or any other mixing and/or extruding apparatus which may provide sufficient shear to fibrillate the fibrillatable PTFE particles, for example, a Banbury mixer. In manufacture of the asphalt modifier, the copolymer and PTFE-$MoS_2$ additive are mixed under high shear until the mixture becomes uniform in appearance.

In addition, while it is preferred to combine a preassociation of fibrillatable PTFE and $MoS_2$ particles with pellet-like thermoplastic elastomeric copolymer, the copolymer can be combined with the fibrillatable polytetrafluoroethylene and molybdenum disulfide particles separately. In such a situation, after placing the thermoplastic elastomeric copolymer in the shear-producing mixing and/or extruding apparatus, fibrillatable polytetrafluoroethylene particles and molybdenum disulfide particles are then added to the apparatus as mixing is effected. The amount of molybdenum disulfide used in the invention to effect a more uniform and effective combination of the fibrillated polytetrafluoroethylene and the thermoplastic elastomeric copolymer may be easily determined by adding the molybdenum disulfide to the fibrillatable polytetrafluoroethylene copolymer mixture until the fibrillatable polytetrafluoroethylene becomes uniformly fibrillated and mixed with the copolymer.

In preferred methods of manufacturing the asphalt modifier, about 93 percent of the fibrillatable polytetrafluoroethylene particles are converted to fibrils, that is, elongated, solid PTFE fiber-like elements, with shear. As noted above, fibrillatable polytetrafluoroethylene is preferably a coagulated dispersion, and may include as much as ten percent (by weight) of non-solid, binder which is not converted into fibrils. This binder may include in large part unpolymerized polytetrafluoroethylene. It is theorized that in the asphalt modifier of the invention the unpolymerized polytetrafluoroethylene acts like a chemically inert coating for the thermoplastic copolymer structure and the fibrillated polytetrafluoroethylene mechanically combines with the elastomeric mid block polymers, that is, the elastomeric polymer portion of the molecular structure formed by the lattice of thermoplastic elastomeric copolymer. Such a theory can be one explanation for the fact that after several days at elevated temperature there is no noticeable degradation of the asphalt modifier including thermoplastic elastomeric copolymer mixed with the fibrillated PTFE-molybdenum disulfide additive.

EXAMPLE 1

In manufacturing an asphalt composition of the invention, an asphalt is combined with an asphalt modifier which is a combination of fibrillated polytetrafluoroethylene, molybdenum disulfide and a thermoplastic elastomeric copolymer.

Such an asphalt modifier comprises 100 parts rubber of EniChem linear SBS copolymer SOL T6302 combined with two parts (per hundred rubber) of preassociated fibrillatable PTFE and molybdenum disulfide particles sold by Alphaflex Industries, Inc. under their tradename Alphaflex 101. Alphaflex 101 includes a preassociation of FLUON CD1 fibrillatable PTFE particles having diameters in the range of about 100 to about 600 microns, and molybdenum disulfide particles having an average particle size in the range of about one to about ten microns being largely adherent to the fibrillatable PTFE particles. The asphalt modifier results from mixing the linear SBS T6302 copolymer and Alphaflex 101 additive together in a twin screw extruder until substantially all of the fibrillatable PTFE is fibrillated and uniformly mixed with the linear SBS T6302 copolymer and extruded as an asphalt modifier for use in the invention.

The asphalt modifier is then combined with AC-20 asphalt to provide an asphalt composition of the invention using standard asphalt preparation techniques well known to those skilled in the art. Approximately 3.75 percent by weight of the asphalt modifier is mixed with the liquified AC-20 asphalt at temperatures above the glass transition temperature, but below the degradation temperature, of the linear SBS T6302 copolymer. Samples of the resulting AC-20 asphalt composition of the invention, without aggregate, are prepared for various tests.

The AC-20 asphalt composition samples of the invention demonstrate surprising enhanced physical properties. In the force ductility test, the AC-20 asphalt composition of the invention has six times the tensile properties of the unmodified AC-20 asphalt at 1,000 percent elongation, and the maximum tensile strength of the AC-20 asphalt composition of the invention is almost ten times better than the tensile strength of the unmodified AC-20 asphalt. A table of the comparative physical properties follows:

| COMPARISON OF PHYSICAL PROPERTIES | | |
|---|---|---|
|  | AC-20 | AC-20+ 3.75% T6302 with 2 phr Alphaflex 101 |
| Absolute Viscosity, poises @ 140° F. | 2,050 | 8,400 |
| Kinematic Viscosity, cst @ 275° F. | 351 | 1,351 |
| Penetration, dmm @ 77° F. | 66 | 46 |
| Ring & Ball Softening Point, Degrees F. | 120 | 167 |
| Elastic Recovery, Percent | 7.5 | 95 |
| Force Ductility, Pounds @ 1,000% | 0.0 | 0.55 |
| Elongation Maximum Force After Initial Yield | 0.04 | 0.97 |

The physical properties of AC-20 asphalt composition of this invention are surprisingly better than not only the unmodified AC-20 asphalt, but also the AC-20 asphalt when modified with 3.75 percent of the linear SBS T6302 copolymer alone. For example, the elongation maximum force after initial yield of the AC-20 asphalt composition of the invention is four times that of AC-20 asphalt when modified with the linear SBS T6302 alone.

Thus, surprisingly improved asphalts for road construction can be provided with the invention. In an asphalt composition of the invention, an asphalt is mixed in the ratio of from about 92 to about 97 percent by weight of asphalt with about 3 to about 8 percent by weight of an asphalt modifier which itself includes about 88 to about 98 percent by weight thermoplastic non-vulcanite elastomeric copolymer combined with about two to about 12 percent of fibrillated PTFE particles and molybdenum disulfide particles, preferably in a ratio of three parts by weight of fibrillated PTFE to one part by weight of molybdenum disulfide.

In laying pavement with an asphalt composition of the invention, the aggregate content of the road typically can comprise about 92 to about 96 percent by weight of the pavement and the asphalt content can comprise approximately four to about eight percent by weight. With asphalt compositions of the invention, as little as 0.000024 percent of fibrillated polytetrafluoroethylene and molybdenum disulfide incorporated into the asphalt composition of the pavement can surprisingly improve the rheological and temperature susceptibility properties of the asphalt road, even if reground rubber is used to replace a portion of the mineral aggregate normally used.

Compared with asphalts equally modified with only thermoplastic elastomeric copolymers, asphalt compositions of this invention demonstrate surprisingly and unexpectedly improved penetration resistance and resistance to the penetration of water, substantially greater tensile strengths, substantially reduced polymer degradation with temperature and aging, substantially improved chemical inertness and resistance to chemical breakdown from hydrocarbons such as oil and gasoline to which a road surface is typically exposed, substantially reduced flow in response to stress at elevated temperatures, substantially improved elastic recovery, reduced compression setability, and improved recyclability and melt process ability.

Because of its improved physical properties, an asphalt composition of this invention can provide the strength of concrete and the recyclability of thermoplastics. Asphalt pavement modified with only thermoplastic elastomeric copolymers cannot be recycled without loss of physical strength and reduced adhesion with incorporated aggregate and reground rubber. Typically, asphalt compositions of the invention including as an thermoplastic elastomeric copolymer portion either SBS or SIS copolymers can be recycled up to five times with no loss of physical strength, such as ultimate tensile strength. As demonstrated by the substantial improvement in mechanical strength of asphalt compositions of the invention, the effect of the fibrillated polytetrafluoroethylene and molybdenum disulfide additive improves the ultimate tensile strength dramatically.

In addition, in the past, road surfaces have been provided with a smooth upper surface to shed water, and the upper asphalt layer of an asphalt road construction included sand as an aggregate in the upper surface, but sand, while providing a smoother upper surface, could not prevent the flow and rutting of the upper asphalt surface. The use of heavier aggregates, while tending to prevent asphalt flow in response to temperature and pressure, led to the breakup of the upper asphalt surface because of water penetration, particularly in colder climates. Asphalt compositions of the invention can prevent these problems by providing a smooth upper surface and preventing flow of the asphalt in the composition in response to temperature and pressure, thereby avoiding rutting and substantially extending the life of the road surface. In addition, the use of asphalts compositions of the invention can eliminate the use of a rubber layer which is frequently laid between the top layer and under layer of the road.

While a preferred embodiment and best made of the invention have been described above, changes may be made in the described embodiments without departing from the scope of this invention as established in the following claims.

I claim:

1. An asphalt composition comprising:
   asphalt, and
   an asphalt modifier including
   a thermoplastic elastomeric copolymer and an effective amount of a fibrillated polytetrafluoroethylene and molybdenum disulfide particles.

2. The asphalt composition of claim 1 wherein the asphalt composition comprises from about 92 percent to about 97 percent asphalt by weight and about 3 percent to about 8 percent asphalt modifier by weight.

3. The asphalt composition of claim 2 wherein the thermoplastic elastomeric copolymer comprises a two phase copolymer of two incompatible polymers comprising a thermoplastic end block polymer and an elastomeric mid block polymer.

4. The asphalt composition of claim 3 wherein the thermoplastic end block polymer is a styrene polymer.

5. The asphalt composition of claim 3 wherein the elastomeric mid block polymer is a polymer selected from a group consisting of polybutadiene, polyisoprene and poly(ethylene-butylene).

6. The asphalt composition of claim 3 wherein the elastomeric mid block polymer comprises an unsaturated polymer.

7. The asphalt composition of claim 3 wherein the elastomeric mid block polymer is a saturated polymer.

8. The asphalt composition of claim 1 wherein the ratio of fibrillated polytetrafluoroethylene to molybdenum disulfide is in a range of about 3 to 1 to about 6 to 1 by weight.

9. The asphalt composition of claim 1 further comprising an unpolymerized polytetrafluorethylene binder residue of the fibrillated polytetrafluoroethylene.

10. The asphalt composition of claim 1 wherein the fibrillated polytetrafluoroethylene and molybdenum disulfide comprise from about 2 to about 12 parts by weight per 100 parts of copolymer.

11. The asphalt composition of claim 1 wherein said thermoplastic elastomeric copolymer is a styrene-butadiene copolymer, and said effective amount of fibrillated polytetrafluoroethylene and molybdenum disulfide comprises from about 2 percent to about 12 parts per 100 parts by weight of copolymer, the ratio of fibrillated polytetrafluoroethylene to molybdenum disulfide being about 3 to 1 by weight.

12. The asphalt composition of claim 1 wherein said thermoplastic elastomeric copolymer is a styrene-isoprene copolymer, and said effective amount of fibrillated polytetrafluoroethylene and molybdenum disulfide comprises from about 2 percent to about 12 parts per 100 parts by weight of copolymer, the ratio of fibrillated polytetrafluoroethylene to molybdenum disulfide being about 3 to 1 by weight.

13. The asphalt composition of claim 1 wherein said thermoplastic elastomeric copolymer is a styrene-ethylene-butadiene copolymer, and said effective amount of fibrillated polytetrafluoroethylene and molybdenum disulfide comprises from about 2 percent to about 12 parts per 100 parts by weight of copolymer, the ratio of fibrillated polytetrafluoroethylene to molybdenum disulfide being about 3 to 1 by weight.

14. A method of making an asphalt composition comprising the steps of
    providing a quantity of asphalt, providing a quantity of asphalt modifier comprising a quantity of thermoplastic elastomeric copolymer particles and an effective amount of fibrillatable polytetraflouroethylene particles and molybdenum disulfide particles, and mixing the asphalt and the asphalt modifier together.

15. The method of claim 14 wherein the mixing step includes the step of forming a mixture of about 92 percent to about 97 percent by weight of asphalt and about 3 percent to about 8 percent by weight of asphalt modifier.

16. The method of claim 15 wherein the step of providing the quantity of asphalt modifier includes the steps of placing a quantity of thermoplastic elastomeric copolymer particles in a high shear mixer, placing an effective amount of fibrillatable polytetrafluoroethylene particles in said high shear mixer, adding an effective amount of molybdenum disulfide particles to the mixture of thermoplastic elastomeric copolymer particle and fibrillatable polytetrafluoroethylene particles, and mixing and shearing the particles of thermoplastic elastomeric copolymer, fibrillatable polytetrafluoroethylene and molybdenum disulfide until substantially all of the fibrillatable polytetrafluoroethylene particles are fibrillated and combined with the thermoplastic elastomeric copolymer.

17. The method of claim 14 wherein the thermoplastic elastomeric copolymer comprises a two phase copolymer of two incompatible polymers comprising a thermoplastic end block polymer and an elastomeric mid block polymer.

18. The method of claim 17 wherein the thermoplastic end block polymer is a styrene polymer.

19. The method of claim 17 wherein the elastomeric mid block polymer is a polymer selected from a group consisting of polybutadiene, polyisoprene and poly(ethylene-butylene).

20. The method of claim 17 wherein the elastomeric mid block polymer comprises an unsaturated polymer.

21. The method of claim 17 wherein the elastomeric mid block polymer is a saturated polymer.

22. The method of claim 16 wherein the ratio of fibrillated polytetrafluoroethylene to molybdenum disulfide is in the range of about 3 to 1 to about 6 to 1 by weight.

23. The method of claim 16 wherein a polytetrafluoroethylene binder residue of the fibrillated polytetrafluoroethylene is uniformly mixed into the asphalt modifier.

24. The method of claim 16 wherein the fibrillated polytetrafluoroethylene and molybdenum disulfide comprise from about 2 to about 12 parts by weight per 100 parts of copolymer.

25. The method of claim 16 wherein mixing fibrillates at least 90 percent of the fibrillatable polytetrafluoroethylene.

26. The method of claim 16 wherein during mixing the temperature of the mixture is maintained below the degradation temperature of the thermoplastic elastomeric copolymer.

27. A method of making an asphalt composition, comprising the steps of preparing a preassociated combination of fibrillatable polytetrafluoroethylene particles and molybdenum disulfide particles by agitating a mixture of the fibrillatable polytetrafluoroethylene particles and molybdenum disulfide particles until the molybdenum disulfide particles are, in substantial part, adherent to said fibrillatable polytetrafluoroethylene particles, placing a quantity of a thermoplastic elastomeric copolymer particles in a twin screw extruder, adding an effective amount of preassociated fibrillatable polytetrafluoroethylene and molybdenum disulfide particle into said twin screw extruder, operating said twin screw extruder to uniformly combine fibrillated polytetrafluoroethylene and molybdenum disulfide particles with said thermoplastic elastomeric copolymer and extrude the mixture for use as an asphalt modifier, adding the asphalt modifier to a quantity of asphalt, and mixing the asphalt and asphalt modifier.

* * * * *

UNITED STATES PATENT AND TRADEMARK OFFICE
CERTIFICATE OF CORRECTION

PATENT NO. : 5,399,598

DATED : March 21, 1995

INVENTOR(S) : William E. Peters

It is certified that error appears in the above-indentified patent and that said Letters Patent is hereby corrected as shown below:

In Col. 3, line 34, after "copolymers" insert --
--(SBS), styrene-isoprene-styrene copolymers Signed and Sealed this Twenty-second Day of August, 1995

Attest:

BRUCE LEHMAN

*Attesting Officer*     *Commissioner of Patents and Trademarks*